(12) United States Patent
Beuss (10) Patent No.: US 12,534,052 B2
(45) Date of Patent: Jan. 27, 2026

(54) BRAKE SYSTEM

(71) Applicant: Continental Automotive Technologies GmbH, Hannover (DE)

(72) Inventor: Jochen Beuss, Erzhausen (DE)

(73) Assignee: Continental Automotive Technologies GmbH, Franfurt am Main (DE)

( * ) Notice: Subject to any disclaimer, the term of this patent is extended or adjusted under 35 U.S.C. 154(b) by 555 days.

(21) Appl. No.: 17/995,258

(22) PCT Filed: Mar. 25, 2021

(86) PCT No.: PCT/DE2021/200039
§ 371 (c)(1),
(2) Date: Sep. 30, 2022

(87) PCT Pub. No.: WO2021/197554
PCT Pub. Date: Oct. 7, 2021

(65) Prior Publication Data
US 2023/0242085 A1  Aug. 3, 2023

(30) Foreign Application Priority Data

Apr. 1, 2020  (DE) ...................... 10 2020 204 221.7

(51) Int. Cl.
*B60T 8/32*  (2006.01)
(52) U.S. Cl.
CPC ......... *B60T 8/321* (2013.01); *B60T 2270/402* (2013.01); *B60T 2270/416* (2013.01); *B60Y 2400/81* (2013.01)
(58) Field of Classification Search
CPC ............... B60T 8/321; B60T 2270/402; B60T 2270/413; B60T 2270/416; B60T 8/171; B60T 8/172; B60Y 2400/81
See application file for complete search history.

(56) References Cited

U.S. PATENT DOCUMENTS 5,952,799 A   9/1999  Maisch et al.
6,345,225 B1  2/2002  Bohm et al.
(Continued)

FOREIGN PATENT DOCUMENTS

CN      1861445 A   11/2006
CN    104401226 A    3/2015
(Continued)

OTHER PUBLICATIONS

Notice of Reasons for Refusal drafted Oct. 18, 2023 for the counterpart Japanese Patent Application No. 2022-555119 and translation of same.
(Continued)

*Primary Examiner* — Pamela Rodriguez (57) ABSTRACT

A brake system has at least two electromechanical wheel brakes and a central control unit. Each wheel brake has a wheel-specific control unit for controlling the deceleration moment exerted on a vehicle wheel by the respective wheel brake. The brake system has at least one rotational speed sensor per vehicle wheel. The central control unit is connected to the wheel-specific control units of the wheel brakes via a data bus for the exchange of control signals. The rotational speed sensors are each directly connected to the wheel-specific control unit of the wheel brake of the respective vehicle wheel for transmission of the ascertained rotational speed information. The wheel-specific control units are each configured to control a deceleration moment exerted by the respective wheel brake on the respective vehicle wheel on the basis of the received rotational speed information and the control signals received from the central control unit.

18 Claims, 5 Drawing Sheets

(56) References Cited

U.S. PATENT DOCUMENTS

| | | | |
|---|---|---|---|
| 8,989,949 B2 * | 3/2015 | Lohberg | B60T 8/171 701/31.4 |
| 2003/0130781 A1 * | 7/2003 | Schramm | B60T 8/349 303/121 |
| 2010/0198473 A1 | 8/2010 | Strengert et al. | |
| 2014/0100719 A1 | 4/2014 | Thibault | |
| 2016/0339885 A1 | 11/2016 | Linhoff | |
| 2024/0116482 A1 * | 4/2024 | Einig | B60T 8/172 |

FOREIGN PATENT DOCUMENTS

| | | |
|---|---|---|
| CN | 208053433 | 11/2018 |
| CN | 109664868 A | 4/2019 |
| DE | 19634567 A1 | 3/1998 |
| DE | 19832167 A1 | 5/1999 |
| DE | 19957632 A1 | 5/2001 |
| DE | 102007036259 A1 | 2/2009 |
| EP | 1032518 A1 | 9/2000 |
| EP | 1889766 A2 | 2/2008 |
| JP | 2001523619 A | 11/2001 |
| KR | 20160108465 A | 9/2016 |

OTHER PUBLICATIONS

German Search Report dated Nov. 16, 2020 for the counterpart German Patent Application No. 10 2020 204 221.7.

The International Search Report and the Written Opinion of the International Searching Authority mailed on Mar. 25, 2021 for the counterpart PCT Application No. PCT/DE2021/000039.

Office action dated Dec. 20, 2023 of the CN counterpart, application No. 202180020146.0.

Office action dated Apr. 11, 2024 of the KR counterpart, application No. 10-2022-7031002.

Chinese Notice of Allowance date Jun. 3, 2024 for the counterpart Chinese Patent Application No. 202180020146.0 and machine translation of same.

* cited by examiner

Prior Art

BRAKE SYSTEM

CROSS-REFERENCE TO RELATED APPLICATIONS

The present application is a National Stage Application under 35 U.S.C. § 371 of International Patent Application No. PCT/DE2021/200039 filed on Mar. 25, 2021, and claims priority from German Patent Application No. 10 2020 204 221.7 filed on Apr. 1, 2020, in the German Patent and Trademark Office, the disclosures of which are herein incorporated by reference in their entireties.

TECHNICAL FIELD

The invention relates to a brake system for a motor vehicle.

BACKGROUND

Figure 1:
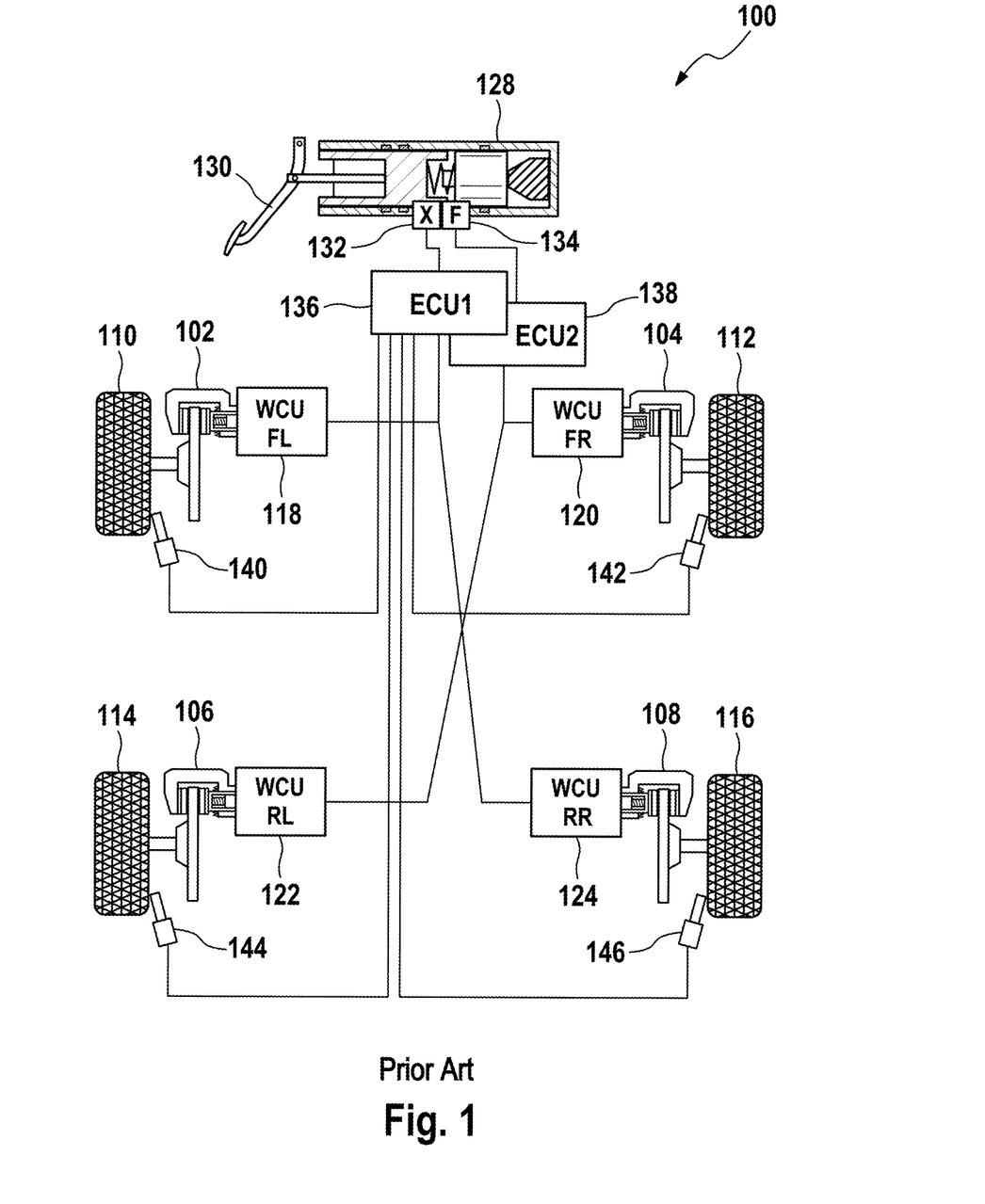
FIG. 1 shows a schematic illustration of a brake system.

Such a brake system is shown by way of example in FIG. 1. Here, the illustrated brake system 10 has a total of four electromechanical wheel brakes 102, 104, 106 and 108, which are assigned to in each case one vehicle wheel 110, 112, 114 and 116. Furthermore, the brake system 10 has a brake actuating unit 128, which has a travel sensor 132 and a force sensor 134 for the detection of a driver braking demand in the event of actuation of the brake pedal 130 that is connected to the brake actuating unit 128. For the processing of the actuation information items ascertained by the travel sensor 132 and the force sensor 134, the brake system 10 has two central control units 136 and 138, wherein the travel sensor 132 is connected to the first control unit 136 and the force sensor 138 is connected to the second control unit.

Furthermore, at the vehicle wheels 110, 112, 114 and 116, there is arranged in each case one rotational wheel speed sensor 140, 142, 144 and 146 that is configured to ascertain the present rotational speed of the associated vehicle wheel 110, 112, 114 or 116. Here, the rotational wheel speed sensors 140, 142, 144 and 146 are connected in each case directly to the control unit 136 for the transmission of the ascertained rotational wheel speed information items. The control unit 136 is furthermore configured to copy the received rotational wheel speed information items and transmit these to the second control unit 138. The control units 136 and 138 in turn generate control signals on the basis of the actuating information item received from the travel sensor 132 and the force sensor 134 and on the basis of the rotational wheel speed information items, which control signals are transmitted to the wheel brakes 102, 104, 106 and 108 for the control thereof.

Here, the wheel brakes 102, 104, 106 and 108 have in each case one wheel-specific control unit 118, 120, 124 and 126 that is configured to control the brake-application force imparted by the respective wheel brakes 102, 104, 106 and 108, or the deceleration moment exerted on the vehicle wheels 110, 112, 114 and 116 owing to the brake-application force, on the basis of the control signals. Here, for the transmission of the corresponding information items, the first control unit 136 is connected exclusively to the wheel-specific control unit 118 of the wheel brake 102 of the front left wheel 110 and the wheel-specific control unit 124 of the wheel brake 108 of the rear right wheel 116, whereas the second control unit 138 is connected exclusively to the wheel-specific control unit 120 of the wheel brake 104 of the front right wheel 112 and the wheel-specific control unit 122 of the wheel brake 106 of the rear left wheel 114. The result is a division of the wheel brakes 102, 104, 106 and 108 into diagonal brake circuits. Here, a bus system is used for the transmission of the control signals.

However, the copying and transmission of the rotational wheel speed information from the first control unit to the second control unit entails additional expenditure on hardware and in particular on corresponding line connections. Furthermore, in the case of a direct connection of the control units and, in the event of a fault in one of the brake circuits, for example owing to a malfunction of the corresponding energy supply, there is the risk that this fault also directly influences that control unit which is actually unaffected.

Furthermore, in the described infrastructure, the central control units 136 and 138 are inter alia also used to implement closed-loop brake control functions, such as closed-loop ABS control functions. Here, in the event of failure of one of the control units, the closed-loop ABS control function of the affected wheel brakes must be transferred to the remaining control unit. Such a disruption-free transfer is highly complex. Finally, the bus system used gives rise to dead times that adversely affect the speed of the closed control loop.

SUMMARY

A brake system has at least two electromechanical wheel brakes and a central control unit. Each electromechanical wheel brake has a wheel-specific control unit for controlling the deceleration moment exerted on a vehicle wheel by the respective wheel brake, wherein the brake system furthermore has at least one rotational wheel speed sensor per vehicle wheel for the ascertainment of a rotational wheel speed information item that describes the rotational wheel speed of the corresponding vehicle wheel. The central control unit is connected to the wheel-specific control units of the wheel brakes via a data bus for the exchange of control signals. The rotational wheel speed sensors of vehicle wheels equipped with an electromechanical wheel brake are in each case directly connected to the wheel-specific control unit of the electromechanical wheel brake arranged at the respective vehicle wheel for the transmission of the ascertained rotational wheel speed information items. The wheel-specific control units are in each case configured to, on the basis of the received rotational wheel speed information items and the control signals received from the central control unit, control a deceleration moment exerted by the wheel brake respectively assigned to the wheel-specific control unit on the vehicle wheel respectively assigned to the wheel brake.

A closed-loop brake control function, and for example closed-loop wheel slip control, may implemented through the control of the deceleration moment by means of the wheel-specific control units. For this purpose, provision may be made whereby the control signals include for example a reference speed of the vehicle. By comparing this reference speed with the present rotational wheel speed of the associated vehicle wheel, the wheel-specific control units can ascertain the slip of the vehicle wheel and correspondingly perform closed-loop control of the deceleration moment imparted by the wheel brake through closed-loop control of the brake-application force of the wheel brake.

The rotational wheel speed sensors may be connected via very short lines directly to the wheel-specific control units of the wheel brakes, which control units are also arranged in the region of the vehicle wheel. Furthermore, the rotational wheel speed information items are available to the wheel-specific control units virtually without delay.

Here, in one embodiment, provision is furthermore made whereby the wheel-specific control units transmit the rotational wheel speed information items respectively received from the rotational wheel speed sensors to the central control unit via the data bus. Existing infrastructure in the form of the data bus may be utilized for the transmission of the rotational wheel speed information items, such that no additional connections are required between the wheel-specific control units and the central control unit. Furthermore, the rotational wheel speed information items can thus be provided to the central control unit quickly, such that the determination and provision of control signals, for example of a reference speed of the vehicle, is expedited.

Alternatively or in addition, in a further embodiment, provision is made whereby at least one of the wheel-specific control units is connected via a direct data connection to the central control unit and provides the received rotational wheel speed information item to the central control unit via the direct data connection. It is thus possible for the rotational wheel speed information items to be provided to the central control unit quickly, because the transmission is not bound to the data bus and any dead times involved in the transmission via the data bus. In one embodiment, the wheel-specific control units may be attached to the wheel brakes of the front wheels of the vehicle because, in the event of an intense deceleration, in vehicles where the front wheels impart a major part of the braking power and it is consequently the case that fast closed-loop wheel slip control may be required at these wheels.

In another embodiment to expedite the provision of the rotational wheel speed information items to the central control unit, it is provided that at least one of the rotational wheel speed sensors may be connected to the wheel-specific control unit of the wheel brake assigned to the vehicle wheel and may also be connected to the central control unit for the transmission of the ascertained rotational wheel speed information item. Signal redundancy is furthermore created in this way, because the rotational wheel speed information items can still be provided to the central control unit even if a wheel-specific control unit has failed and the rotational wheel speed information items can consequently no longer be transmitted.

Here, in a further embodiment, the provision of the rotational wheel speed information items to the central control unit can be expedited by virtue of two rotational wheel speed sensors being arranged at least one of the vehicle wheels, wherein one of the rotational wheel speed sensors is connected to the central control unit and the other rotational wheel speed sensor is connected to the wheel-specific control unit of the wheel brake assigned to the vehicle wheel for the transmission of the ascertained rotational wheel speed information item. Therefore. in the event of failure of one of the rotational wheel speed sensors of a wheel, a determination of the rotational wheel speed, and consequently closed-loop control of the deceleration moment, remains possible. Additionally, both rotational wheel speed sensors of a vehicle wheel are may be accommodated in a common housing but galvanically isolated from one another.

In a further embodiment, it is furthermore provided that the wheel-specific control units are directly connected in each case to at least one further wheel-specific control unit of the brake system for the exchange of the respectively ascertained rotational wheel speed information items.

For the communication of the rotational wheel speed information items between the wheel-specific control units, use may be made for example of a bus system, such as in the form of a data connection line running between the wheel-specific control units. In this way, in the event of a failure of the central control unit, the wheel-specific control units are capable of independently ascertaining a reference speed of the vehicle by virtue of the rotational wheel speed information items being exchanged among the wheel-specific control units and wheel speeds being calculated in each case independently, such that closed-loop control of the deceleration moments imparted by the wheel brakes also remains possible.

Here, in a further embodiment to provide a failsafe the brake system has a brake actuating unit which is configured to, in the event of actuation by a vehicle driver, output a braking demand information item that corresponds to the actuation, wherein the brake actuating unit is directly connected to at least one of the wheel-specific control units for the transmission of the braking demand information item. Here, it may be provided for example that the brake actuating unit has two mutually independent sensors for detecting a braking demand of a vehicle driver, wherein a first of the sensors is connected directly to the central control unit of the brake system, whereas a second of the sensors is connected directly to one of the wheel-specific control units.

It is thus possible for braking demands or the corresponding braking demand information items to be processed directly by the wheel-specific control units, such that a failure of the central control unit can be fully compensated for.

BRIEF DESCRIPTION OF THE DRAWINGS

The present disclosure will become more fully understood from the detailed description and the accompanying drawings, wherein.

DETAILED DESCRIPTION

In the description that follows, features that are similar or identical will be denoted by the same reference designations.

Figure 2:
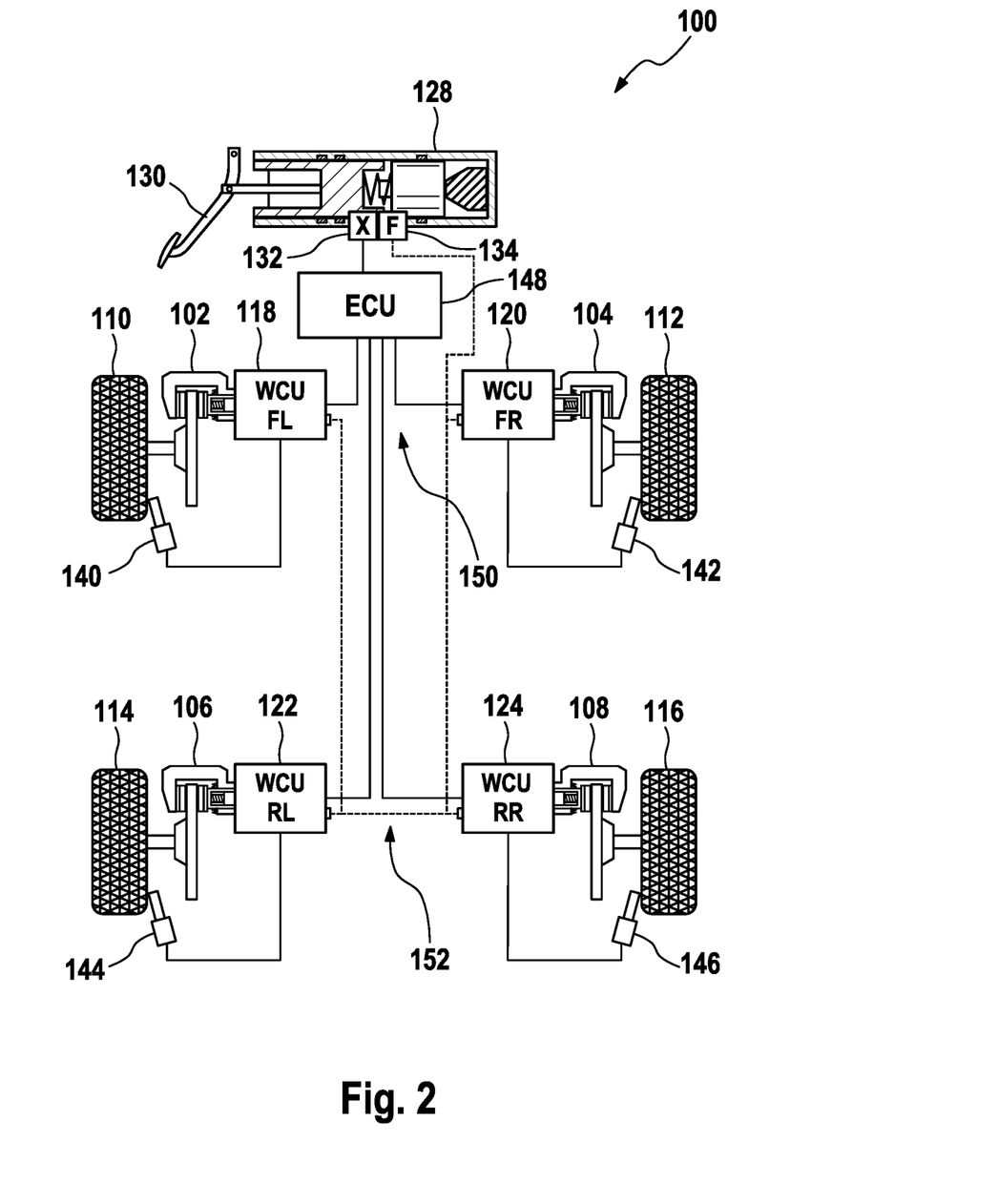
FIG. 2 shows a schematic illustration of a first embodiment of an exemplary brake system.

Analogously to the brake system 10 of FIG. 1, the brake system 100 illustrated in FIG. 2 has four electromechanical wheel brakes 102, 104, 106 and 108, which are in each case configured to impart a deceleration moment to the vehicle wheels 110, 112, 114 and 116 at which they are arranged. Here, the wheel brakes 102, 104, 106 and 108 have in each case one wheel-specific control unit 118, 120, 122 and 124, which wheel-specific control units are configured to control the respectively associated wheel brake 102, 104, 106 and 108 with regard to the imparted brake-application force and consequently the deceleration moment exerted on the corresponding vehicle wheel 110, 112, 114 and 116. Furthermore, at each vehicle wheel 110, 112, 114 and 116, there is arranged in each case one rotational wheel speed sensor 140, 142, 144 and 146 that is configured to determine a present rotational wheel speed of the corresponding vehicle wheel 110, 112, 114, 116.

Furthermore, the brake system 100 of FIG. 2 also has a brake actuating unit 128 which, by means of two sensors 132 and 134, outputs corresponding actuation information items in the event of an actuation of a brake pedal 130 assigned to the brake actuating unit 128. Here, in the example illustrated, the first sensor 132 is a travel sensor, and the second sensor 134 is a force sensor. By contrast to the brake system 10 discussed above with regard to FIG. 1, the brake system 100 of FIG. 2 however has only a single central control unit 148. Here, the central control unit 148 is connected to the force sensor 132 for the transmission of a detected actuation information item. Furthermore, the central control unit 148 is connected to each of the wheel-specific control units 118, 120, 122 and 124 directly via a first bus system 150, which may be in a star configuration.

The rotational wheel speed sensors 140, 142, 144 and 146 may be furthermore connected in each case directly to the wheel-specific control units 118, 120, 122 and 124 of the corresponding wheels 110, 112, 114 and 116 for the transmission of an ascertained rotational wheel speed information item. The rotational wheel speed information items thus communicated are then transmitted by the wheel-specific control units 118, 120, 122 and 124 to the central control unit 148, such that the central control unit 148 may use the rotational wheel speed information item for the ascertainment of control signals for the wheel brakes 102, 104, 106, 108. For example, it may be provided that the central control unit 148 ascertains a reference speed of the vehicle from the received rotational wheel speed information items, and transmits said reference speed as a control signal to the wheel-specific control units 118, 120, 122 and 124 via the bus system 150.

The wheel-specific control units 118, 120, 122 and 124 are then configured to ascertain a wheel slip from the rotational wheel speed information items, which are obtained from the directly connected rotational wheel speed sensors 140, 142, 144 and 146, and the control signal of the central control unit 148, and to actuate the wheel brakes 102 as necessary such that the wheel slip remains within defined limits.

Furthermore, in the illustrated brake system 100, the wheel-specific control units 118, 120, 122 and 124 are in each case connected to one another via a second bus system 152. Here, the bus system 152 is configured such that each wheel-specific control unit 118, 120, 122 and 124 is connected to at most two further wheel-specific control units 118, 120, 122 and 124, resulting in a chain of connected wheel-specific control units 118, 120, 122 and 124. Thus, in the illustrated refinement, the wheel-specific control unit 118 of the wheel brake 102 of the front left wheel 110 is connected exclusively directly to the wheel-specific control unit 122 of the wheel brake 106 of the rear left wheel 114. The wheel-specific control unit 122 of the wheel brake 106 of the rear left wheel 114 is in turn connected to the wheel-specific control unit 124 of the wheel brake 108 of the rear right wheel 116, which in turn is connected to the wheel-specific control unit 120 of the wheel brake 104 of the front right wheel 112. Finally, the wheel-specific control unit 120 of the wheel brake 104 of the front right wheel 112 is also connected to the force sensor 134 of the brake actuating unit 128 for the transmission of an actuation signal.

By means of the network that is connected via the second bus system 152, the wheel-specific control units 118, 120, 122 and 124 are configured to exchange the respectively received rotational wheel speed information items with the further wheel-specific control units 118, 120, 122 and 124 and, for example in the event of a failure of the central control unit 148, independently determine a reference speed of the vehicle from the rotational wheel speed information items thus obtained. Here, it is furthermore possible for a braking demand to be ascertained owing to the connection of the bus system 152 to the force sensor 134 of the brake actuating unit 128, such that a failure of the central control unit 148 can be fully compensated for.

The described brake system 100 has closed-loop control of the deceleration moments exerted by the wheel brakes 102, 104, 106 and 108 on the wheels 110, 112, 114 and 116 which is performed in decentralized fashion, wherein the rotational wheel speed information items required for this purpose are provided to the wheel-specific control units 118, 120, 122 and 124 via short signal paths, allowing high closed-loop control dynamics. Furthermore, through the use of the second bus system 152, a failure of the central control unit 148 can be compensated for, such that a fall-back level can also be implemented by way of the described configuration of the brake system. Here, the wheel-specific control units 118, 120, 122 and 124 may be electrically separate, such that malfunctions in one component of the system do not lead to a failure of the brake system 100 as a whole. Even if individual wheel brakes 102, 104, 106 or 108 were to fail, closed-loop wheel slip control can still be performed by way of at least the three remaining wheel brakes 102, 104, 106 or 108.

Figure 3:
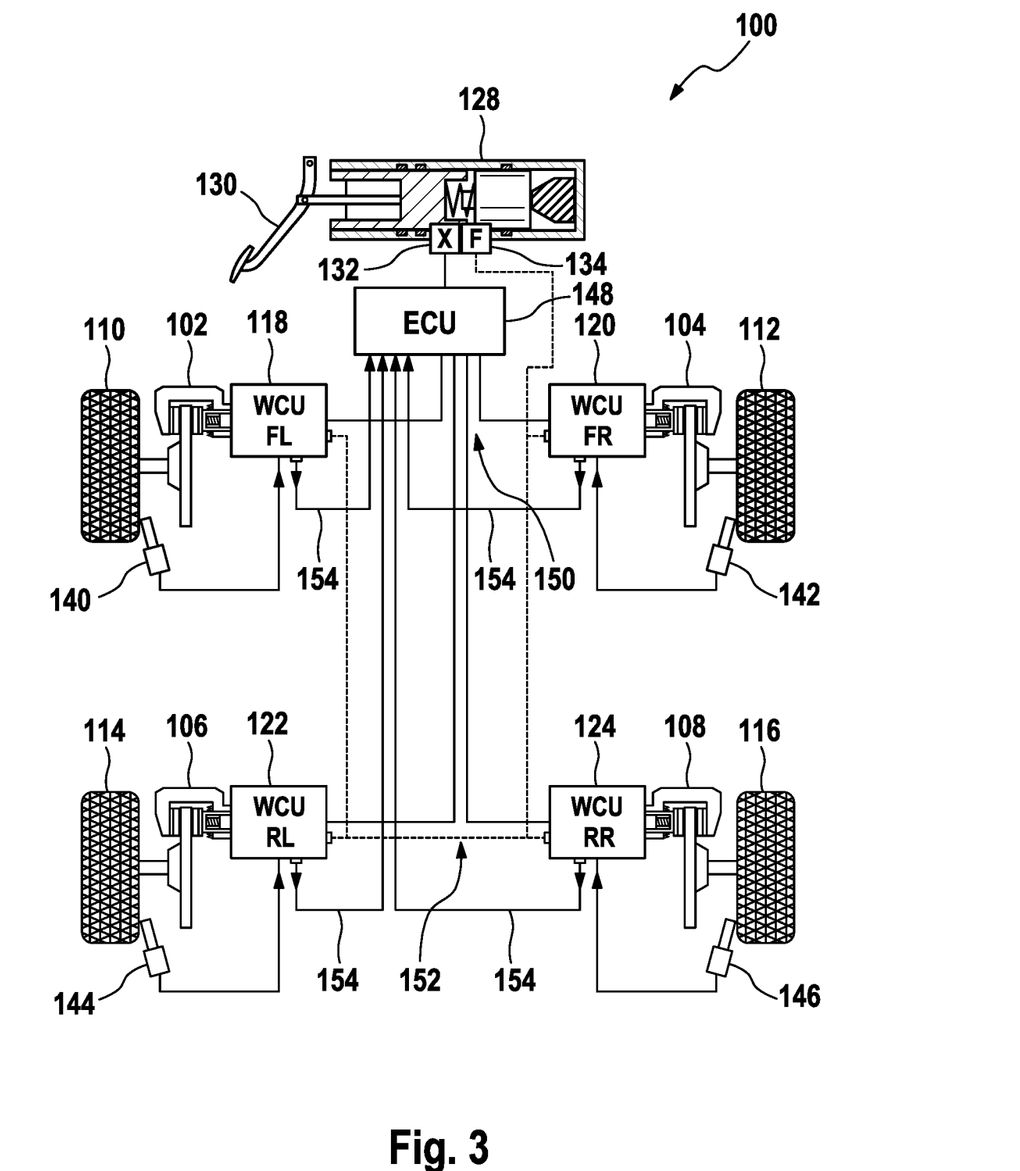
FIG. 3 shows a schematic illustration of a second embodiment of the exemplary brake system.

FIG. 3 shows a schematic illustration of a modified variant of the brake system 100 described above with regard to FIG. 2. Here, the wheel-specific control units 118, 120, 122 and 124 are in each case additionally connected via direct data connections 154 directly to the central control unit 148. It is provided that the wheel-specific control units 118, 120, 122 and 124 transmit the rotational wheel speed information items received from the respective rotational wheel speed sensors 140, 142, 144 and 146 directly to the central control unit 148 via the direct data connections 154. For this purpose, it may for example be provided that the wheel-specific control units 118, 120, 122 and 124 copy the respectively received rotational wheel speed information items directly after receiving them, and transmit these via the direct data connection 154 without a delay. The control signals generated by the central control unit 148 may be however furthermore transmitted via the first bus system 150 to the wheel-specific control units 118, 120, 122 and 124. By means of the direct connection of the wheel-specific control units 118, 120, 122 and 124 to the central control unit 148 for the transmission of the rotational wheel speed information items, the provision of the rotational wheel speed information items to the central control unit 148 can be expedited.

Figure 4:
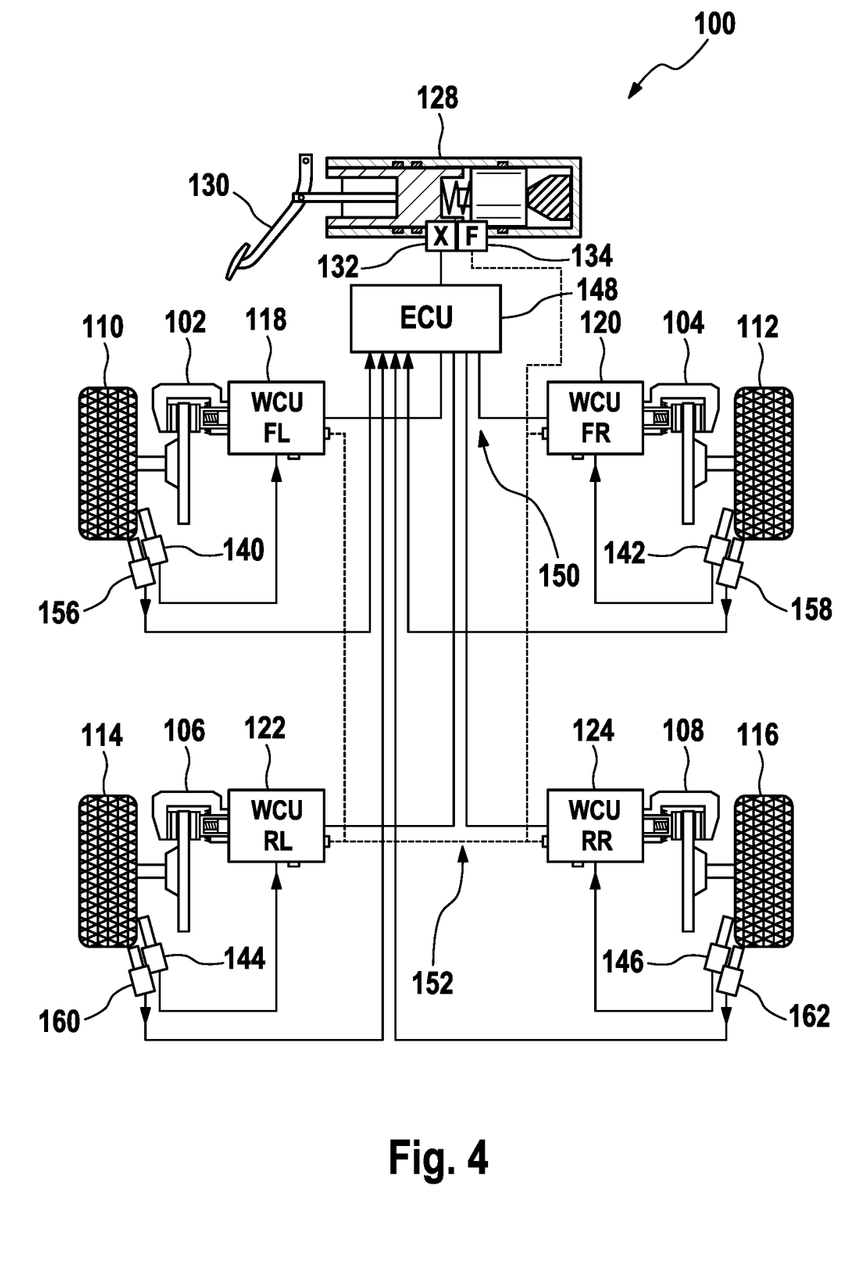
FIG. 4 shows a schematic illustration of a third embodiment of the exemplary brake system.

A further variant of the brake system 100 discussed with regard to FIG. 2, which serves for expediting a provision of the rotational wheel speed information items to the central control unit 148, is illustrated in FIG. 4. Here, by contrast to the brake system 100 illustrated in FIG. 2, it is additionally provided that in each case one additional rotational wheel speed sensor 156, 158, 160 and 162 is provided per vehicle wheel 110, 112, 114 and 116 and is likewise configured to ascertain the rotational wheel speed of the associated vehicle wheel 110, 112, 114, 116. Here, the additional rotational wheel speed sensors 156, 158, 160 and 162 are in each case directly connected to the central control unit 148, such that the ascertained rotational wheel speeds are provided to the central control unit 148 ideally in real time.

The refinement of the brake system 100 illustrated in FIG. 4 furthermore provides that in the event of failure of one of the rotational wheel speed sensors 140, 142, 144 or 146, closed-loop wheel slip control remains possible at the affected vehicle wheel 110, 112, 114 or 116 because the required rotational wheel speed information items can continue to be provided by the remaining rotational wheel speed sensor 156, 158, 160 or 162.

Figure 5:
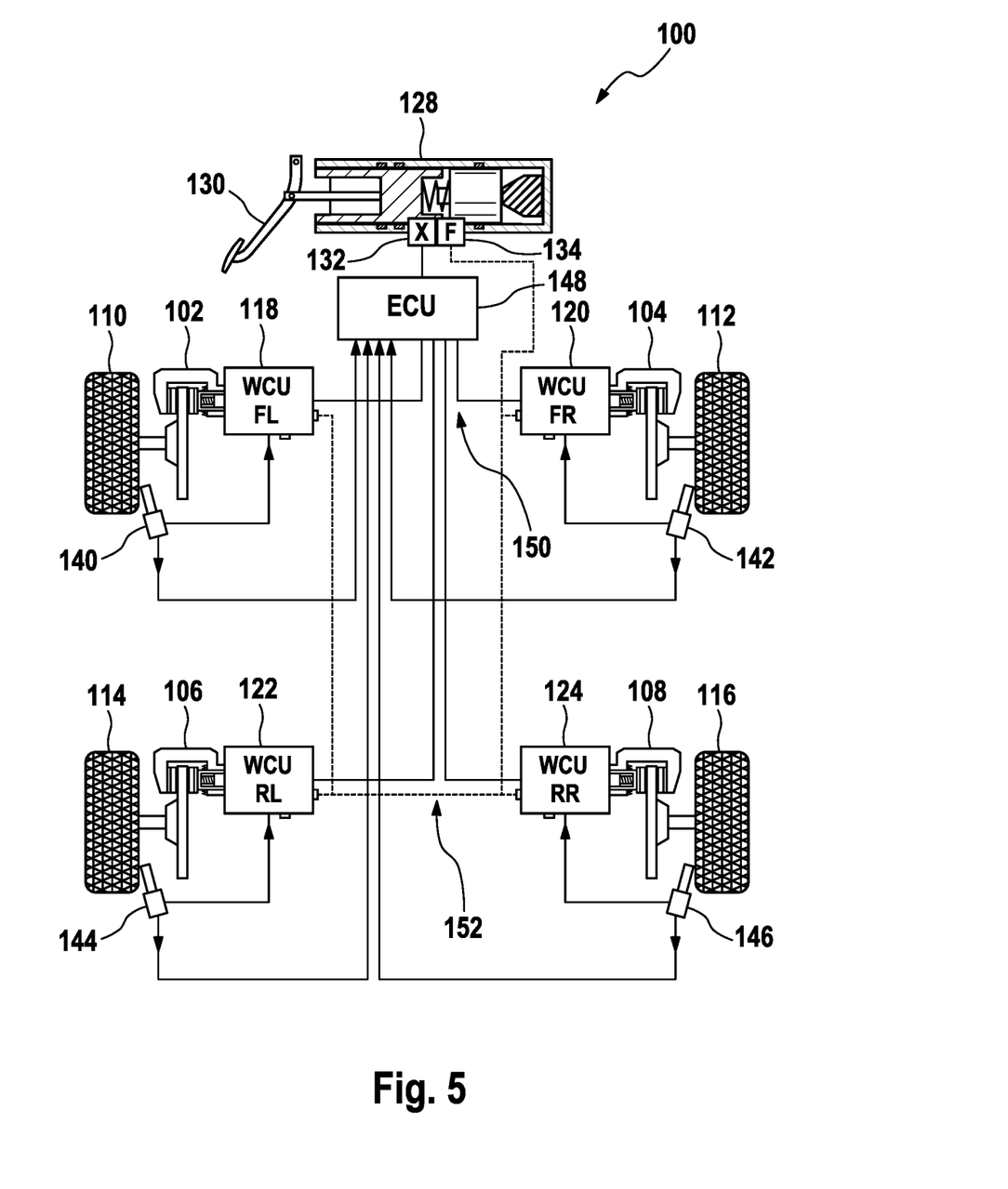
FIG. 5 shows a schematic illustration of a fourth embodiment of the exemplary brake system.

In an alternative refinement of the brake system 100, which is illustrated in FIG. 5, the additional rotational wheel speed sensors 156, 158, 160 and 160 are integrated into the respectively existing rotational wheel speed sensors 140, 142, 144 and 146. Thus, proceeding from the four rotational wheel speed sensors 140, 142, 144 and 146, it is possible for both direct connections to the wheel-specific control units 118, 120, 122 and 124 and connections directly to the central control unit 148 to be established for the transmission of rotational wheel speed information items, such that a provision of the rotational wheel speed information items in real time is possible in this case too.

Here, the rotational wheel speed sensors 156, 158, 160 and 160, which in this refinement are integrated into the housings of the rotational wheel speed sensors 140, 142, 144 and 146, are in each case galvanically separate from the rotational wheel speed sensors 140, 142, 144 or 146 arranged in the same housing, such that mutual influencing of the rotational wheel speed sensors is avoided.

Here, in the variants of FIGS. 4 and 5, it may furthermore be provided that, despite the direct connection of the rotational wheel speed sensor arrangement to the central control unit 148, the wheel-specific control units 118, 120, 122 and 124 furthermore transmit the received rotational wheel speed information items to the central control unit 148, such that a redundancy of the signal transmission is created.

The invention claimed is:

1. A brake system comprising:
   at least two electromechanical wheel brakes;
   a central control unit;
   a wheel-specific control unit for each electromechanical wheel brake for controlling the deceleration moment exerted on a vehicle wheel by the respective wheel brake, wherein the central control unit is connected to the wheel-specific control units of the wheel brakes via a data bus for the exchange of control signals;
   at least one rotational wheel speed sensor per vehicle wheel to ascertain rotational wheel speed information that describes the rotational wheel speed of the corresponding vehicle wheel, wherein the rotational wheel speed sensors of the vehicle wheels equipped with an electromechanical wheel brake are each directly connected to the wheel-specific control unit of the electromechanical wheel brake of the respective vehicle wheel for the transmission of the rotational wheel speed information and connected to the central control unit such that the wheel speed information can be provided to the central control unit even if the respective wheel-specific control unit has failed; and
   wherein the wheel-specific control units are in each case configured to control a deceleration moment exerted by the wheel brake respectively assigned to the wheel-specific control unit on the vehicle wheel respectively assigned to the wheel brake on the basis of the received rotational wheel speed information and the control signals received from the central control unit.

2. The brake system as claimed in claim 1, wherein the wheel-specific control units transmit the rotational wheel speed information respectively received from the rotational wheel speed sensors to the central control unit via the data bus.

3. The brake system as claimed in claim 2, wherein at least one of the wheel-specific control units is connected via a direct data connection to the central control unit and provides the received rotational wheel speed information to the central control unit via the direct data connection.

4. The brake system as claimed in claim 1, wherein at least one of the rotational wheel speed sensors is connected to the wheel-specific control unit of the wheel brake assigned to the vehicle wheel and is also connected to the central control unit for the transmission of the ascertained rotational wheel speed information.

5. The brake system as claimed in claim 1, wherein at least one of the vehicle wheels has two rotational wheel speed sensors arranged thereat, wherein one of the two rotational wheel speed sensors is connected to the central control unit and the other of the two rotational wheel speed sensor is connected to the wheel-specific control unit of the wheel brake assigned to the vehicle wheel for the transmission of the ascertained rotational wheel speed information.

6. The brake system as claimed in claim 1, wherein the wheel-specific control units are each directly connected to at least one further wheel-specific control unit of the brake system for the exchange of respectively ascertained rotational wheel speed information.

7. The brake system as claimed in claim 6, wherein the brake system has a brake actuating unit which is configured to output braking demand information that corresponds to an actuation event by a vehicle driver, wherein the brake actuating unit is directly connected to at least one of the wheel-specific control units for the transmission of the braking demand information.

8. A brake system comprising:
   at least two electromechanical wheel brakes;
   a central control unit;
   a wheel-specific control unit for each electromechanical wheel brake for controlling the deceleration moment exerted on a vehicle wheel by the respective wheel brake, wherein the central control unit is connected to the wheel-specific control units of the wheel brakes via a data bus for the exchange of control signals;
   at least one rotational wheel speed sensor per vehicle wheel to ascertain rotational wheel speed information that describes the rotational wheel speed of the corresponding vehicle wheel, wherein the rotational wheel speed sensors of the vehicle wheels equipped with an electromechanical wheel brake are each directly connected to the wheel-specific control unit of the electromechanical wheel brake of the respective vehicle wheel for the transmission of the rotational wheel speed information; and
   wherein the wheel-specific control units are in each case configured to control a deceleration moment exerted by the wheel brake respectively assigned to the wheel-specific control unit on the vehicle wheel respectively assigned to the wheel brake on the basis of the received rotational wheel speed information and the control signals received from the central control unit;
   a direct data connection between the at least one of the wheel-specific control units and the central control unit and provides the received rotational wheel speed information to the central control unit via the direct data connection.

9. The brake system as claimed in claim 8, wherein the wheel-specific control units transmit the rotational wheel speed information respectively received from the rotational wheel speed sensors to the central control unit via the data bus.

10. The brake system as claimed in claim 8, wherein at least one of the rotational wheel speed sensors is connected to the wheel-specific control unit of the wheel brake assigned to the vehicle wheel and is also connected to the central control unit for the transmission of the ascertained rotational wheel speed information.

11. The brake system as claimed in claim 8, wherein at least one of the vehicle wheels has two rotational wheel speed sensors arranged thereat, wherein one of the two rotational wheel speed sensors is connected to the central control unit and the other of the two rotational wheel speed sensor is connected to the wheel-specific control unit of the wheel brake assigned to the vehicle wheel for the transmission of the ascertained rotational wheel speed information.

12. The brake system as claimed in claim 8, wherein the wheel-specific control units are each directly connected to at least one further wheel-specific control unit of the brake system for the exchange of respectively ascertained rotational wheel speed information.

13. The brake system as claimed in claim 12, wherein the brake system has a brake actuating unit which is configured to output braking demand information that corresponds to an actuation event by a vehicle driver, wherein the brake actuating unit is directly connected to at least one of the wheel-specific control units for the transmission of the braking demand information.

14. A brake system comprising:
   at least two electromechanical wheel brakes;
   a central control unit;
   a wheel-specific control unit for each electromechanical wheel brake for controlling the deceleration moment exerted on a vehicle wheel by the respective wheel brake, wherein the central control unit is connected to the wheel-specific control units of the wheel brakes via a data bus for the exchange of control signals;
   at least one rotational wheel speed sensor per vehicle wheel to ascertain rotational wheel speed information that describes the rotational wheel speed of the corresponding vehicle wheel, wherein the rotational wheel speed sensors of the vehicle wheels equipped with an electromechanical wheel brake are each directly connected to the wheel-specific control unit of the electromechanical wheel brake of the respective vehicle wheel for the transmission of the rotational wheel speed information; and
   wherein the wheel-specific control units are in each case configured to control a deceleration moment exerted by the wheel brake respectively assigned to the wheel-specific control unit on the vehicle wheel respectively assigned to the wheel brake on the basis of the received rotational wheel speed information and the control signals received from the central control unit; and
   wherein the wheel-specific control units are each directly connected to at least one further wheel-specific control unit of the brake system for the exchange of respectively ascertained rotational wheel speed information.

15. The brake system as claimed in claim 14, wherein the wheel-specific control units transmit the rotational wheel speed information respectively received from the rotational wheel speed sensors to the central control unit via the data bus.

16. The brake system as claimed in claim 14, wherein at least one of the rotational wheel speed sensors is connected to the wheel-specific control unit of the wheel brake assigned to the vehicle wheel and is also connected to the central control unit for the transmission of the ascertained rotational wheel speed information.

17. The brake system as claimed in claim 14, wherein at least one of the vehicle wheels has two rotational wheel speed sensors arranged thereat, wherein one of the two rotational wheel speed sensors is connected to the central control unit and the other of the two rotational wheel speed sensor is connected to the wheel-specific control unit of the wheel brake assigned to the vehicle wheel for the transmission of the ascertained rotational wheel speed information.

18. The brake system as claimed in claim 17, wherein the brake system has a brake actuating unit which is configured to output braking demand information that corresponds to an actuation event by a vehicle driver, wherein the brake actuating unit is directly connected to at least one of the wheel-specific control units for the transmission of the braking demand information.

* * * * *